United States Patent
Seto

(10) Patent No.: US 9,381,786 B2
(45) Date of Patent: Jul. 5, 2016

(54) VEHICULAR AIR CONDITIONING APPARATUS

(75) Inventor: Takahiro Seto, Utsunomiya-shi (JP)

(73) Assignee: KEIHIN CORPORATION (JP)

( * ) Notice: Subject to any disclaimer, the term of this patent is extended or adjusted under 35 U.S.C. 154(b) by 621 days.

(21) Appl. No.: 13/817,683

(22) PCT Filed: Aug. 16, 2011

(86) PCT No.: PCT/JP2011/068572
§ 371 (c)(1),
(2), (4) Date: Feb. 19, 2013

(87) PCT Pub. No.: WO2012/026369
PCT Pub. Date: Mar. 1, 2012

(65) Prior Publication Data
US 2013/0149953 A1    Jun. 13, 2013

(30) Foreign Application Priority Data

Aug. 23, 2010 (JP) ................................. 2010-186362

(51) Int. Cl.
*B60H 1/34* (2006.01)
*B60H 1/00* (2006.01)
*F24F 13/12* (2006.01)

(52) U.S. Cl.
CPC ........ *B60H 1/00021* (2013.01); *B60H 1/00692* (2013.01); *B60H 2001/00714* (2013.01); *F24F 13/12* (2013.01)

(58) Field of Classification Search
CPC ........... B60H 1/00021; B60H 1/00528; B60H 1/00692
See application file for complete search history.

(56) References Cited

U.S. PATENT DOCUMENTS 5,862,677 A * 1/1999 Kim .................... B60H 1/00064
165/42
6,351,961 B1 * 3/2002 Kurokawa ............ B60H 1/0005
454/121
(Continued)

FOREIGN PATENT DOCUMENTS

CN 101351349 A 1/2009
CN 101737921 A 6/2010
(Continued)

OTHER PUBLICATIONS

International Search Report for International Application No. PCT/JP2011/068572, mailed Nov. 29, 2011, with English translation.
(Continued)

*Primary Examiner* — Steven B McAllister
*Assistant Examiner* — Jonathan Cotov
(74) *Attorney, Agent, or Firm* — Cantor Colburn LLP

(57) ABSTRACT

A vehicular air conditioning apparatus may include a case which forms a passage for conditioned air that flows toward a vehicle interior; a partition plate which divides a space inside the case; a sliding door which moves to change a flow of the conditioned air inside the case; a rack gear provided on the sliding door; and a pinion gear which moves the sliding door by rotating while being engaged with the rack gear. The partition plate may have a guide which slidably supports an end portion of the sliding door. The case may have a seal member, and the sliding door and the seal member may be disposed to slidably oppose each other. The guide may have a cut-out portion in which the seal member is disposed, and an auxiliary guide may be provided in the cut-out portion.

2 Claims, 5 Drawing Sheets

(56) References Cited

U.S. PATENT DOCUMENTS

| | | | |
|---|---|---|---|
| 6,463,998 B1 * | 10/2002 | Shindo | B60H 1/00028 165/204 |
| 6,695,691 B1 * | 2/2004 | Le | B60H 1/00678 454/121 |
| 6,799,432 B2 * | 10/2004 | Nagaya | B60H 1/00528 454/107 |
| 9,139,069 B2 * | 9/2015 | Makita | B60H 1/00692 |
| 2001/0008148 A1 * | 7/2001 | Ito | B60H 1/00692 137/625.46 |
| 2001/0021635 A1 * | 9/2001 | Akahane | B60H 1/00521 454/142 |
| 2002/0009968 A1 * | 1/2002 | Tsurushima | B60H 1/00857 454/121 |
| 2003/0116205 A1 * | 6/2003 | Akahane | B60H 1/00521 137/625.44 |
| 2004/0045309 A1 * | 3/2004 | Nagaya | B60H 1/00528 62/244 |
| 2005/0126774 A1 * | 6/2005 | Yamaguchi | B60H 1/00021 165/204 |
| 2007/0259614 A1 * | 11/2007 | Barnhart | B60H 1/00857 454/121 |
| 2011/0197615 A1 * | 8/2011 | Higa | B60H 1/00692 62/296 |
| 2013/0160971 A1 * | 6/2013 | Makita | B60H 1/00021 165/59 |

FOREIGN PATENT DOCUMENTS

| | | | |
|---|---|---|---|
| JP | 10-205872 A | | 8/1998 |
| JP | 2001-270318 A | | 10/2001 |
| JP | 2001270317 | * | 10/2001 |
| JP | 2004-98747 A | | 4/2004 |
| JP | 2004-098780 A | | 4/2004 |
| JP | 2005-161969 A | | 6/2005 |
| JP | 2005-297592 A | | 10/2005 |
| JP | 2009-274708 A | | 11/2009 |

OTHER PUBLICATIONS

Chinese Office Action regarding Application No. 201180040105.4; Date of Mailing : Sep. 2, 2014, with English translation of Search Report.

* cited by examiner

VEHICULAR AIR CONDITIONING APPARATUS

CROSS REFERENCE TO RELATED APPLICATION

This is the U.S. national stage of application No. PCT/JP2011/068572, filed on Aug. 16, 2011. Priority under 35 U.S.C. §119(a) and 35 U.S.C. §365(b) is claimed from Japanese Application No. 2010-186362, filed 23 Aug. 2010, the disclosures of which are also incorporated herein by reference.

TECHNICAL FIELD

The present invention relates to a vehicular air conditioning apparatus.

BACKGROUND ART

Hitherto, a vehicular air conditioning apparatus for supplying conditioned air into a vehicle interior is mounted in the vehicle.

For example, in Patent Document 1, one of such vehicular air conditioning apparatuses which divides the internal space of a case using a partition plate and is able to independently adjust conditioned air supplied to a driver side and conditioned air supplied to a passenger side is disclosed.

On the other hand, in Patent Document 2, a vehicular air conditioning apparatus which provides a sliding door inside a case, controls the opening area of a flow path opening using the movement position of the sliding door, and generates conditioned air by adjusting the amount of air heated, is disclosed.

CITATION LIST

Patent Document

[Patent Document 1] Japanese Unexamined Patent Application, First Publication No. 2004-98747
[Patent Document 2] Japanese Unexamined Patent Application, First Publication No. 2009-274708

SUMMARY OF INVENTION

Technical Problem

In a case where the sliding door as in Patent Document 2 is provided in the vehicular air conditioning apparatus in which the inside of the case is divided by the partition plate as in Patent Document 1, there may be cases where a guide for guiding the sliding door is provided on the partition plate. In this case, the sliding door moves along the guide provided on the partition plate.

On the other hand, in order not to allow air to leak around the flow path opening of which the opening area is controlled by the sliding door, seal regions are provided around the flow path opening. The seal regions are formed by causing the sliding door to slidably abut on a seal member provided around the opening.

In the vehicular air conditioning apparatus, the guide in the partition plate described above is cut out of the seal member in order to avoid interference with the seal member. Therefore, in the seal region, the sliding door is not guided by the guide but is guided by the seal member.

However, in the vehicular air conditioning apparatus capable of independently controlling the driver side and the passenger side, a shaft provided with a pinion that drives the sliding door is fitted into a shaft insertion hole provided in the partition plate, and thus the surface of the guide and the surface of the seal member slightly deviate from each other due to position error and dimensional error of each of the partition plate and the seal member provided in the case. Accordingly, there may be cases where the sliding door may slightly displace from its original track in the seal region. Here, in a case where the sliding door is moved by a rack and pinion mechanism, there may be cases where the rack and the pinion are slightly separated from each other due to the displacement of the sliding door.

Even though the rack and the pinion are slightly separated from each other, sealability in the seal region may be sufficiently ensured. However, when the gap between the rack and the pinion increases, backlash increases, and the sound of the rack and the pinion impacting each other is increased, which results in an increase in noise.

Aspects according to the present invention have been made taking the foregoing problems into consideration, and an object thereof is to, in a vehicular air conditioning apparatus in which a sliding door is moved by a rack and pinion mechanism along a guide provided in a partition plate that divides the internal space of a case, and reduces noise generated by the rack and pinion mechanism by suppressing the displacement of the sliding door.

Solution to Problem

The aspects according to the present invention employ the following configuration as means for solving the problems.

According to an aspect according to the present invention, a vehicular air conditioning apparatus includes: a case which forms a passage for conditioned air that flows toward a vehicle interior; a partition plate which divides a space inside the case; a sliding door which moves to change a flow of the conditioned air inside the case; a rack gear provided on the sliding door; and a pinion gear which moves the sliding door by rotating while being engaged with the rack gear, wherein the partition plate has a guide which slidably supports an end portion of the sliding door, the case has a seal member, the sliding door and the seal member are disposed to slidably oppose each other, the guide has a cut-out portion in which the seal member is disposed, and an auxiliary guide is provided in the cut-out portion.

In the aspect, the case may be formed by combining a plurality of divided parts, the partition plate may be fixed by being sandwiched between the divided parts, and the auxiliary guide may be formed integrally with partition plate and is sandwiched by the seal member.

In the aspect, the auxiliary guide may be formed integrally with a fitting portion included in the partition plate and fitted to the case.

In the aspect, a plurality of the seal members may be arranged along a movement direction of the sliding door, and at least one of the plurality of the seal members may be disposed at a center portion of the arrangement direction thereof.

Advantageous Effects of Invention

According to the aspect according to the present invention, in the seal region in which the sliding door and the seal member are disposed to slidably oppose each other, the sliding door is guided by the auxiliary guide. The auxiliary guide has a dedicated function of guiding the sliding door, and thus the shape thereof may be set to specialize in smooth guiding of the sliding door, compared to the seal member of which the original function is not guiding the sliding door. Therefore, by installing the auxiliary guide in at least a part of the region that typically guides the sliding door only using the seal member, unintended displacement of the sliding door caused by position error or dimensional error of the seal member may be reliably reduced.

Therefore, according to the aspect according to the present invention, in the vehicular air conditioning apparatus in which the sliding door is moved by the rack and pinion mechanism along the guide provided in the partition plate that divides the internal space of the case, the displacement of the sliding door is suppressed and the rack and the pinion are suppressed from being separated from each other, thereby reducing noise generated by the rack and pinion mechanism.

DESCRIPTION OF EMBODIMENTS

Figure 1:
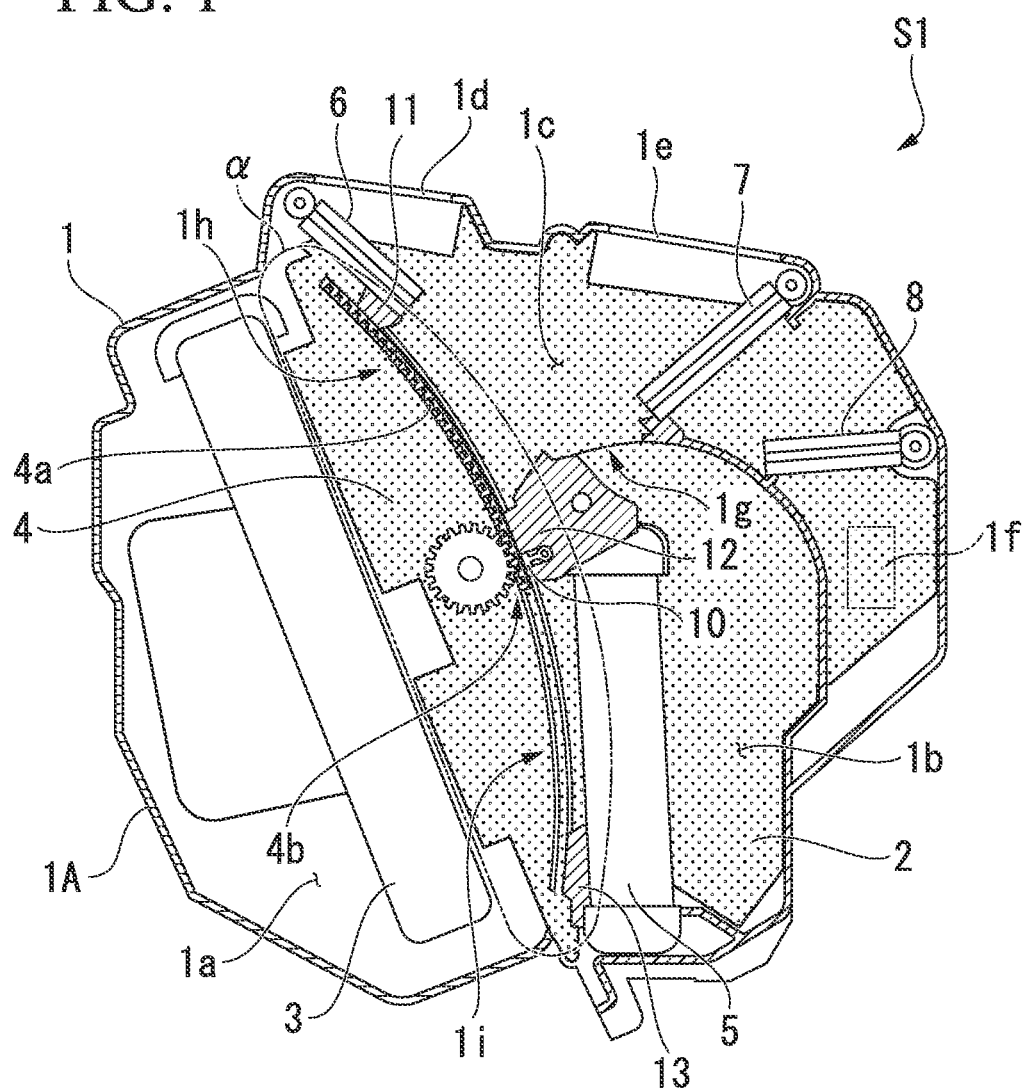
FIG. 1 is a cross-sectional view illustrating the schematic configuration of a vehicular air conditioning apparatus in an embodiment according to the present invention.

Hereinafter, a vehicular air conditioning apparatus in an embodiment according to the present invention will be described with reference to the drawings. In addition, in the drawings, in order to cause each member to have a recognizable size, the scale of each member is appropriately changed.

FIG. 1 is a cross-sectional view illustrating the schematic configuration of a vehicular air conditioning apparatus S1 of this embodiment. In addition, in the vehicular air conditioning apparatus S1 of this embodiment, the inside of a case 1 is divided into two regions by a center plate 2 (partition plate), and the insides of the divided regions have the same configurations which are symmetrical.

In addition, in FIG. 1, one of the divided regions is illustrated.

The vehicular air conditioning apparatus S1 of this embodiment is mounted in a vehicle for supplying conditioned air into the vehicle interior, and as illustrated in FIG. 1, includes the case 1, the center plate 2, an evaporator 3, a sliding door device 4, a heater core 5, a defroster air outlet port mode damper 6, a face air outlet port mode damper 7, and a foot air outlet port mode damper 8.

The case 1 forms the external shape of the vehicular air conditioning apparatus S1 of this embodiment, and includes therein a cooling flow path 1a provided with the evaporator 3, a heating flow path 1b in which the heater core 5 is installed, and a mixing portion 1c in which cold air and warm air are mixed into the conditioned air. In addition, in the case 1, a plurality of air outlet ports (a defroster air outlet port 1d, a face air outlet port 1e, and a foot air outlet port 10 exposed to the outside and connected to the mixing portion 1c are provided.

The defroster air outlet port 1d is an opening for supplying the conditioned air to a window.

In addition, the face air outlet port 1e is an opening for supplying the conditioned air to an occupant. In addition, the foot air outlet port if is an opening for supplying the conditioned air to the feet of the occupant.

In addition, inside the case 1, as illustrated in FIG. 1, a warm air opening 1g which supplies warm air to the mixing portion 1c from the heating flow path 1b in which the heater core 5 is installed, a cold air opening 1h which supplies cold air to the mixing portion 1c from the cooling flow path 1a in which the evaporator 3 is installed, and a heating opening 1i which supplies cold air to the heating flow path 1b from the cooling flow path 1a are provided.

Figure 2A:
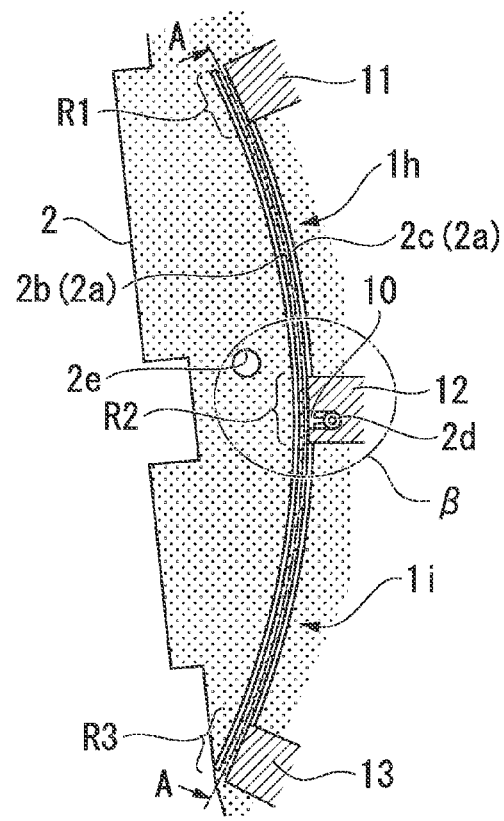
FIG. 2A is a schematic diagram illustrating a region α in FIG. 1 by omitting a sliding door device.
Figure 2B:
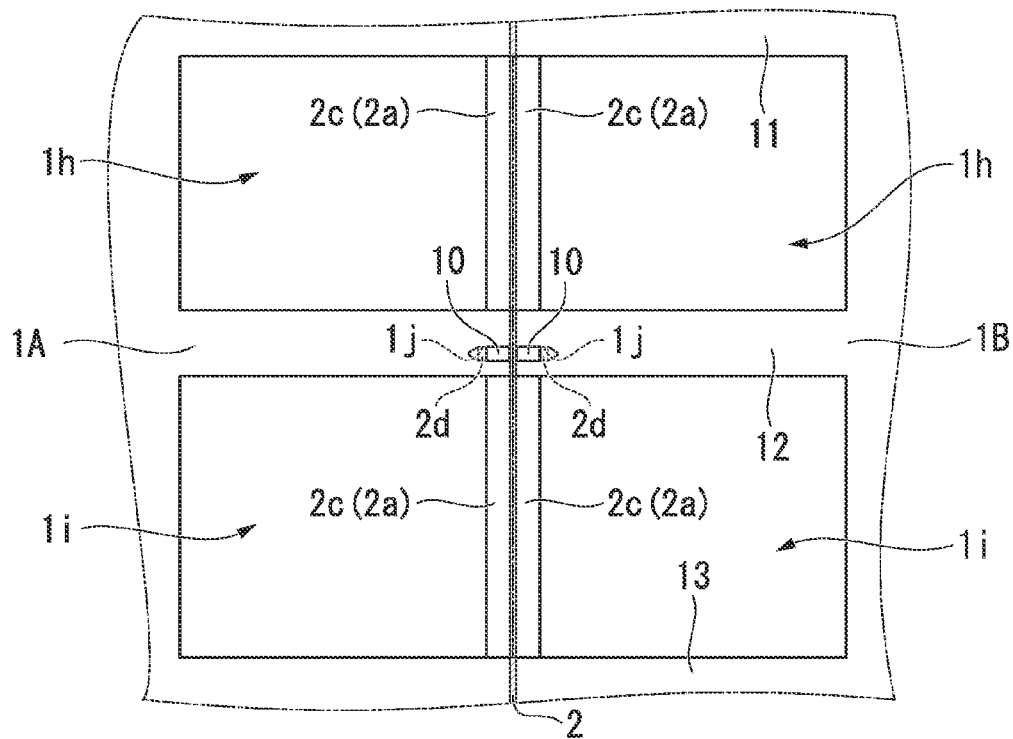
FIG. 2B is a view taken along line A-A in FIG. 2A.

In addition, the case 1 is divided into a driver side and a passenger side and is configured so that a driver side part 1A (divided part) and a passenger side part 1B (divided part) are assembled to each other (see FIG. 2B).

Moreover, the case 1 includes three seal members 11 to 13 arranged in a slide direction of a sliding door 4a included in the sliding door device 4. In addition, the cold air opening 1h is provided between the seal member 11 and the seal member 12, and the heating opening 1i is provided between the seal member 12 and the seal member 13.

The seal members 11 to 13 slidably abut the sliding door 4a, and form seal regions R1 to R3 for suppressing air leakage by abutting the sliding door 4a.

The center plate 2 substantially equally divides the inside of the case 1 into two regions of a driver side region and a passenger side region.

FIGS. 2A and 2B are schematic diagrams illustrating a region α in FIG. 1 by omitting the sliding door device 4, FIG. 2A is a cross-sectional view viewed from the same direction as FIG. 1, and FIG. 2B is a diagram taken along line A-A of FIG. 2A.

Figure 3:
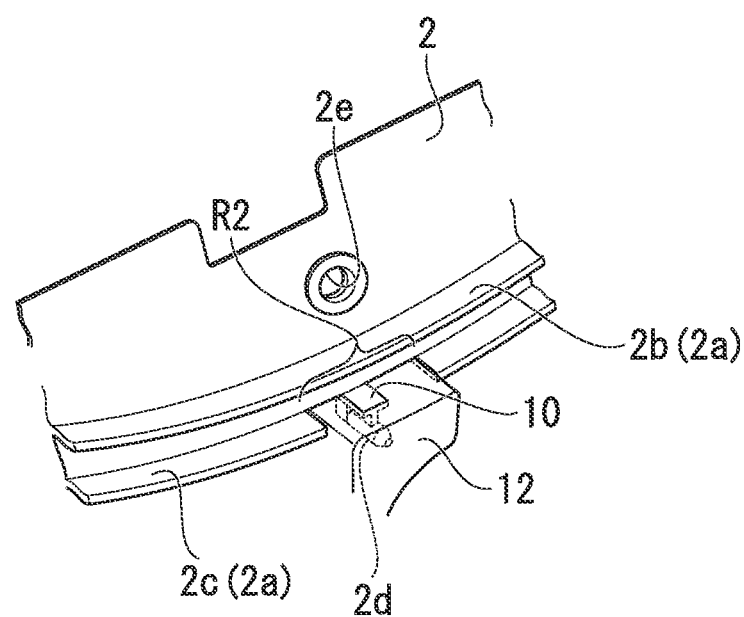
FIG. 3 is a perspective view of a region β in FIG. 2A.

In addition, FIG. 3 is a perspective view of a region β in FIG. 2A.

In addition, as illustrated in this figure, the center plate 2 includes guides 2a for guiding the sliding door 4a of the sliding door device 4. As illustrated in FIG. 2A, the vehicular air conditioning apparatus S1 of this embodiment includes, as the guides 2a, an upstream side guide 2b disposed on the upstream side of an air flow direction and a downstream side guide 2c disposed on the downstream side of the air flow direction. The upstream side guide 2b and the downstream side guide 2c are disposed to oppose each other by being curved in a bow shape along the cold air opening 1h and the heating opening 1i provided inside the case 1.

In addition, the downstream side guide 2c is cut out (cut-out portions) at points where the seal members 11 to 13 are present in order to avoid the interference of the seal members 11 to 13.

In addition, the inner wall of the case 1 that opposes the center plate 2 is provided with a guide (not shown), and one end of the sliding door 4a of the sliding door device 4 is sandwiched by the guide 2a, and the other end thereof slides while being sandwiched by the guide provided in the inner wall of the case 1 so as to be guided.

In addition, as illustrated in FIG. 2B, the center plate 2 is sandwiched between the driver side part 1A and the passenger side part 1B that constitute the case 1 so as to be fixed.

The center plate 2 has a fitting pin 2d (fitting portion) illustrated in FIGS. 2A, 2B, and 3. In addition, in the seal member 12, a fitting hole 1j for fitting the fitting pin 2d of the center plate 2 is provided. Fitting pins (not shown) are further provided on the center plate 2, a plurality of fitting holes (not shown) are provided in the case 1, and the center plate 2 is fixed to the case 1 by fitting the fitting pins into the fitting holes.

In addition, in the vehicular air conditioning apparatus S1 of this embodiment, as illustrated in FIGS. 2A, 2B, and 3, the seal member 12 is provided with an auxiliary guide 10 which is formed integrally with the center plate 2.

The auxiliary guide 10 guides the sliding door 4a in the seal region R2 formed by the sliding door 4a and the seal member 12.

The auxiliary guide 10 is disposed at a position that overlaps the downstream side guide 2c in a case where the downstream side guide 2c provided in the center plate 2 is continued without being cut out of the seal member 12. In addition, as illustrated in FIGS. 2A, 2B, and 3, the auxiliary guide 10 is molded integrally with the fitting pin 2d included in the center plate 2 and is sandwiched between the driver side part 1A and the passenger side part 1B so as to be fixed to the seal member 12.

In addition, in the vehicular air conditioning apparatus S1 of this embodiment, as described above, the plurality of seal members (the seal members 11 to 13) are arranged in the movement direction of the sliding door 4a, and the auxiliary guide 10 is provided in the seal region R2 formed by the seal member 12 disposed at the center portion in the arrangement direction thereof.

The evaporator 3 is a part of a refrigeration cycle mounted in the vehicle and is disposed inside the cooling flow path 1a. The evaporator 3 cools air supplied into the cooling flow path 1a using a blower (not shown), thereby generating cold air.

The sliding door device 4 is disposed on the downstream side of the evaporator 3 and controls the amount of the cold air generated in the evaporator 3 supplied to the heating flow path 1b. More specifically, the sliding door device 4 includes the sliding door 4a which is able to slide between the cold air opening 1h and the heating opening 1i and a rack and pinion mechanism 4b for driving the sliding door 4a.

The rack and pinion mechanism 4b is a mechanism for causing the sliding door 4a to slide, and includes a pinion which is rotatably driven as power is transmitted thereto from a motor (not shown) and a rack which converts the rotational power of the pinion into linear power so as to be transmitted to the sliding door 4a.

In addition, in the vehicular air conditioning apparatus S1 of this embodiment, the rack of the rack and pinion mechanism 4b is formed integrally with the sliding door 4a.

The heater core 5 is disposed inside the heating flow path 1b, and heats the cold air supplied via the heating opening 1i, thereby generating warm air.

The defroster air outlet port mode damper 6 is a damper which opens and closes the defroster air outlet port 1d and is configured to be able to rotate in the case 1.

The face air outlet port mode damper 7 is a damper which opens and closes the face air outlet port 1e and is configured to be able to rotate in the case 1.

The foot air outlet port mode damper 8 is a damper which opens and closes the foot air outlet port 1f and is configured to be able to rotate in the case 1.

In addition, the sliding door device 4, the defroster air outlet port mode damper 6, the face air outlet port mode damper 7, and the foot air outlet port mode damper 8 are supplied with power from motors (not shown).

According to the vehicular air conditioning apparatus S1 of this embodiment having the above configurations, when both the cold air opening 1h and the heating opening 1i are opened by the sliding door device 4, air supplied to the cooling flow path 1a is cooled by the evaporator 3 and becomes cold air, and a part of the cold air is supplied to the heating flow path 1b.

In addition, warm air generated by being heated by the heater core 5 in the heating flow path 1b is supplied to the mixing portion 1c from the warm air opening 1g, and the cold air that is not supplied to the heating flow path 1b is supplied to the mixing portion 1c from the cold air opening 1h.

The cold air and the warm air supplied to the mixing portion 1c are mixed with each other to become temperature-controlled air and are supplied to the vehicle interior from any of the defroster air outlet port 1d, the face air outlet port 1e, and the foot air outlet port 1f, which is open.

In addition, in the vehicular air conditioning apparatus S1 of this embodiment, the sliding door 4a is configured to be independently moved in each of the driver side region and the passenger side region which are formed by dividing the inside of the case 1 by the center plate 2. Therefore, temperature-controlled air having different temperatures may be supplied toward the driver and the passenger.

Here, in the vehicular air conditioning apparatus S1 of this embodiment, the auxiliary guide 10 that guides the sliding door 4a is disposed in the seal region R2 formed by disposing the sliding door 4a and the seal member 12 to slidably oppose each other.

That is, according to the vehicular air conditioning apparatus S1 of this embodiment, in the seal region R2 formed by disposing the sliding door 4a and the seal member 12 to slidably oppose each other, the sliding door 4a is guided by the auxiliary guide 10. The auxiliary guide 10 has a dedicated function of guiding the sliding door 4a, and thus the shape thereof may be set to specialize in smooth guiding of the sliding door 4a, compared to the seal member 12 of which the original function is not guiding the sliding door 4a. As such, by installing the auxiliary guide 10 in at least a part of the region (the seal region R2) that typically guides the sliding door 4a only using the seal member 12, unintended displacement of the sliding door 4a caused by position error or dimensional error of the seal member 12 may be reliably reduced.

Therefore, according to the vehicular air conditioning apparatus S1 of this embodiment, in the vehicular air conditioning apparatus in which the sliding door 4a is moved by the rack and pinion mechanism 4b along the guides 2a provided in the center plate 2 that divides the internal space of the case 1, the displacement of the sliding door 4a is suppressed and the rack and the pinion are suppressed from being separated from each other, thereby reducing noise generated by the rack and pinion mechanism 4b.

In addition, in the vehicular air conditioning apparatus S1 of this embodiment, the auxiliary guide 10 is formed integrally with the center plate 2 and is sandwiched between the driver side part 1A and the passenger side part 1B that constitute the case 1 so as to be fixed to the seal member 12. In addition, the surface of the auxiliary guide 10 is configured to be substantially the same surface as the surface of the seal member 12 (to be positioned on substantially the same plane).

Therefore, error adjustment of the dimensions between a shaft hole 2e and the auxiliary guide 10 provided in the center plate 2 is possible by only adjusting a mold for molding the center plate 2. Therefore, compared to a structure according to the related art in which in both the center plate and the case must be considered, ensuring sufficient sealability in the seal region while preventing the rack and the pinion from being separated from each other is facilitated.

In addition, in the vehicular air conditioning apparatus S1 of this embodiment, the auxiliary guide 10 is formed integrally with the fitting pin 2d included in the center plate 2 and fitted to the case 1.

Therefore, the auxiliary guide 10 is able to be firmly fixed to the case 1, and thus instability due to insufficient strength caused by connection of the center plate 2 to only a part of the auxiliary guide 10 may be solved.

In addition, in the vehicular air conditioning apparatus S1 of this embodiment, the plurality of seal members 11 to 13 arranged in the movement direction of the sliding door 4a are included, and the auxiliary guide 10 is provided in the seal region R2 formed in the seal member 12 disposed at the center portion excluding the end portions in the arrangement direction thereof.

The seal members 11 and 13 at the end portions in the arrangement direction have many regions connected to the inner wall of the case 1 and thus have high strength, resulting in small position error or dimensional error. On the other hand, the seal member 12 at the center portion in the arrangement direction has a few regions connected to the inner wall of the case 1 and thus has low strength, resulting in the position error and dimensional error being likely to increase.

Therefore, by providing the auxiliary guide 10 in the seal member 12 at the center portion in the arrangement direction, it is possible to efficiently suppress the displacement of the sliding door 4a.

Figure 4:
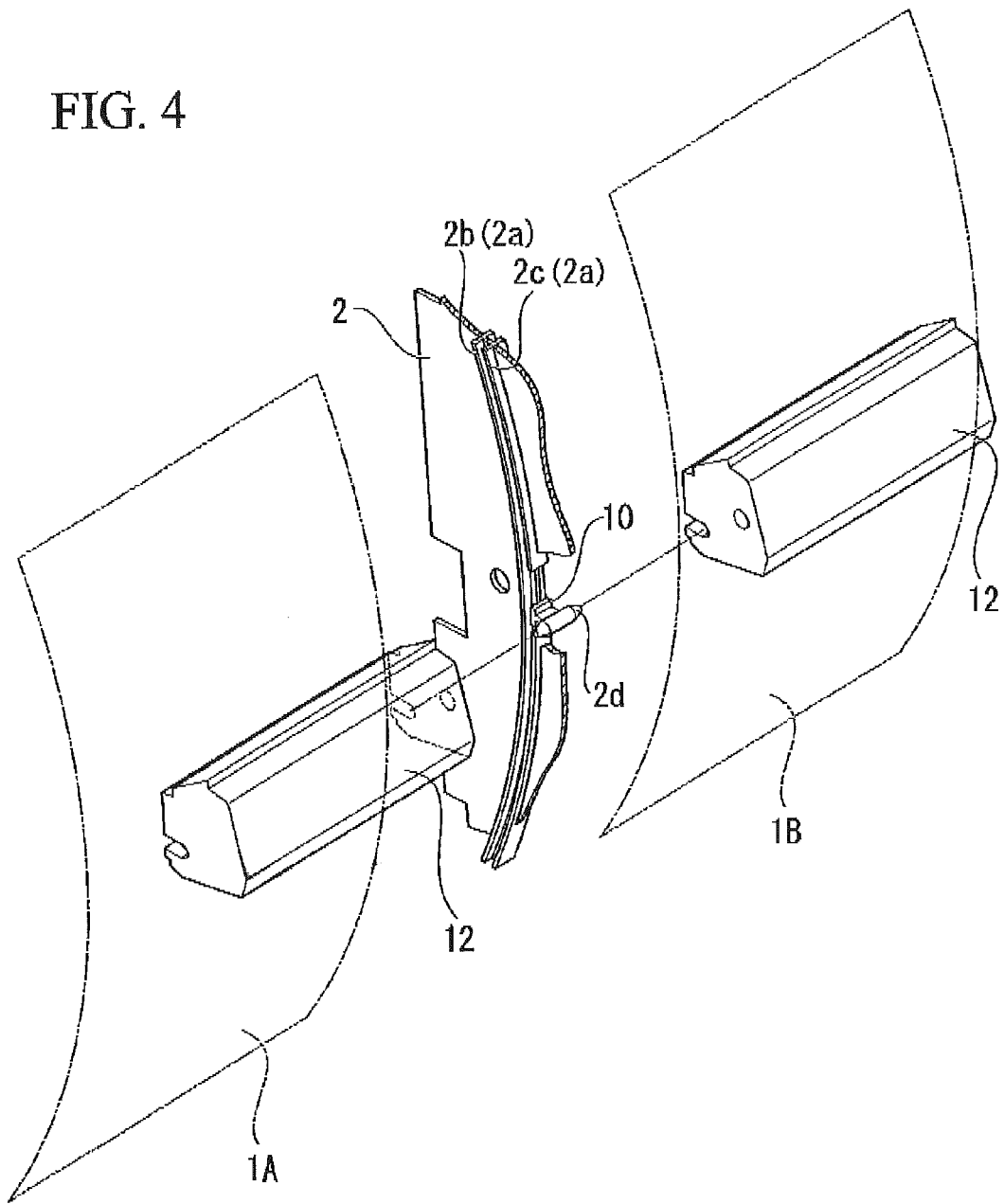
FIG. 4. is a perspective view of an embodiment of a vehicular air condition apparatus.
Figure 5:
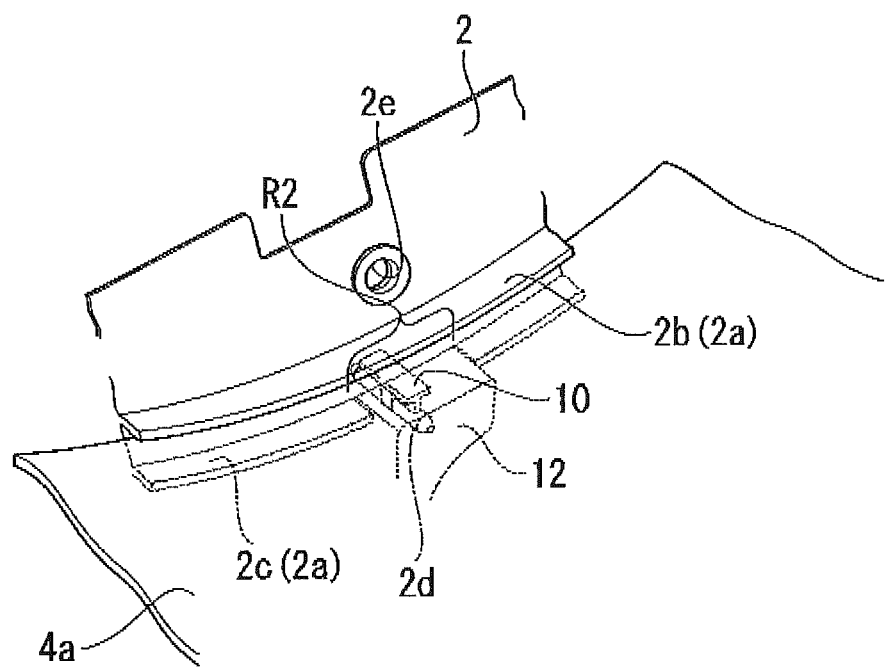
FIG. 5 is a perspective view of a region β in FIG. 2A showing a sliding door mounted to a guide.

Additionally, FIG. 4 and FIG. 5. show additional views of an embodiment of a vehicular air conditioning apparatus. For example, FIG. 4 shows a perspective view of an embodiment of a vehicular air conditioning apparatus and FIG. 5 shows a perspective view of sliding door 4a mounted to a guide 2a.

While the appropriate embodiments of the present invention have been described above with reference to the accompanying drawings, the present invention is not limited to the above-described embodiments. The shapes and combination of the constituent members described in the above-described embodiments are only examples, and various modifications can be made on the basis of design requirements in a range that does not depart from the gist of the present invention.

In the above embodiments, the configuration in which the auxiliary guide 10 is molded integrally with the fitting pin 2d of the center plate 2 and is sandwiched between the driver side part 1A and the passenger side part 1B that constitute the case 1 so as to be fixed to the seal member 12 is described.

However, the present invention is not limited to this, and a configuration in which the auxiliary guide is mounted to a member other than the partition plate or a configuration in which a fitting hole is provided in the seal member and the auxiliary guide is mounted in the fitting hole so as to be fixed may also be employed.

In addition, in the above embodiments, the configuration in which the three seal members are arranged is described.

However, the present invention is not limited thereto, and a configuration in which a larger number of seal members are arranged may also be employed.

In addition, in the above embodiments, the fitting pin 2d is used as the fitting portion.

However, the present invention is not limited thereto, and the fitting portion may have a shape other than the pin shape.

As described above, a vehicular air conditioning apparatus in an aspect according to the present invention includes: a case which forms a passage for conditioned air that flows toward a vehicle interior; a partition plate which divides a space inside the case; a sliding door which moves to change a flow of the conditioned air inside the case; a rack gear provided on the sliding door; and a pinion gear which moves the sliding door by rotating while being engaged with the rack gear, wherein the partition plate has a guide which slidably supports an end portion of the sliding door, the case has a seal member, the sliding door and the seal member are disposed to slidably oppose each other, the guide has a cut-out portion in which the seal member is disposed, and an auxiliary guide is provided in the cut-out portion.

In addition, in the aspect, the case is formed by combining a plurality of divided parts, the partition plate is fixed by being sandwiched between the divided parts, and the auxiliary guide is formed integrally with partition plate and is sandwiched by the seal member.

In addition, in the aspect, the auxiliary guide is formed integrally with a fitting portion included in the partition plate and fitted to the case.

In addition, in the aspect, a plurality of the seal members are arranged along a movement direction of the sliding door, and at least one of the plurality of the seal members is disposed at a center portion of the arrangement direction thereof.

The invention claimed is:

1. A vehicular air conditioning apparatus comprising:
   a case which forms a passage for conditioned air that flows toward a vehicle interior, the case being formed by combining a plurality of divided parts;
   a partition plate which divides a space inside the case and is fixed by being sandwiched between the divided parts;
   a sliding door which moves to change a flow of the conditioned air inside the case;
   a rack gear provided on the sliding door; and
   a pinion gear which moves the sliding door by rotating while being engaged with the rack gear,
   wherein the partition plate has a guide which slidably supports an end portion of the sliding door,
   each of the divided parts has a seal member that extends along a direction perpendicular to a movement direction of the sliding door,
   the sliding door and the seal member are disposed to slidably oppose each other at a downstream side of an air flow of the sliding door,
   the guide has a cut-out portion at the downstream side of the air flow of the sliding door so that the seal member is disposed to slidably oppose the end portion of the sliding door,
   the partition plate is integrally provided with an auxiliary guide that is provided in the cut-out portion to slidably support the end portion of the sliding door, and
   wherein the auxiliary guide is formed integrally with a fitting portion included in the partition plate and fitted to the seal member.

2. The vehicular air conditioning apparatus according to claim 1,
   wherein each of the divided parts has a plurality of the seal members that are arranged along the movement direction of the sliding door, and a middle one of the plurality of the seal members in the arrangement direction thereof is fixed to the auxiliary guide.

* * * * *